Figure 1:
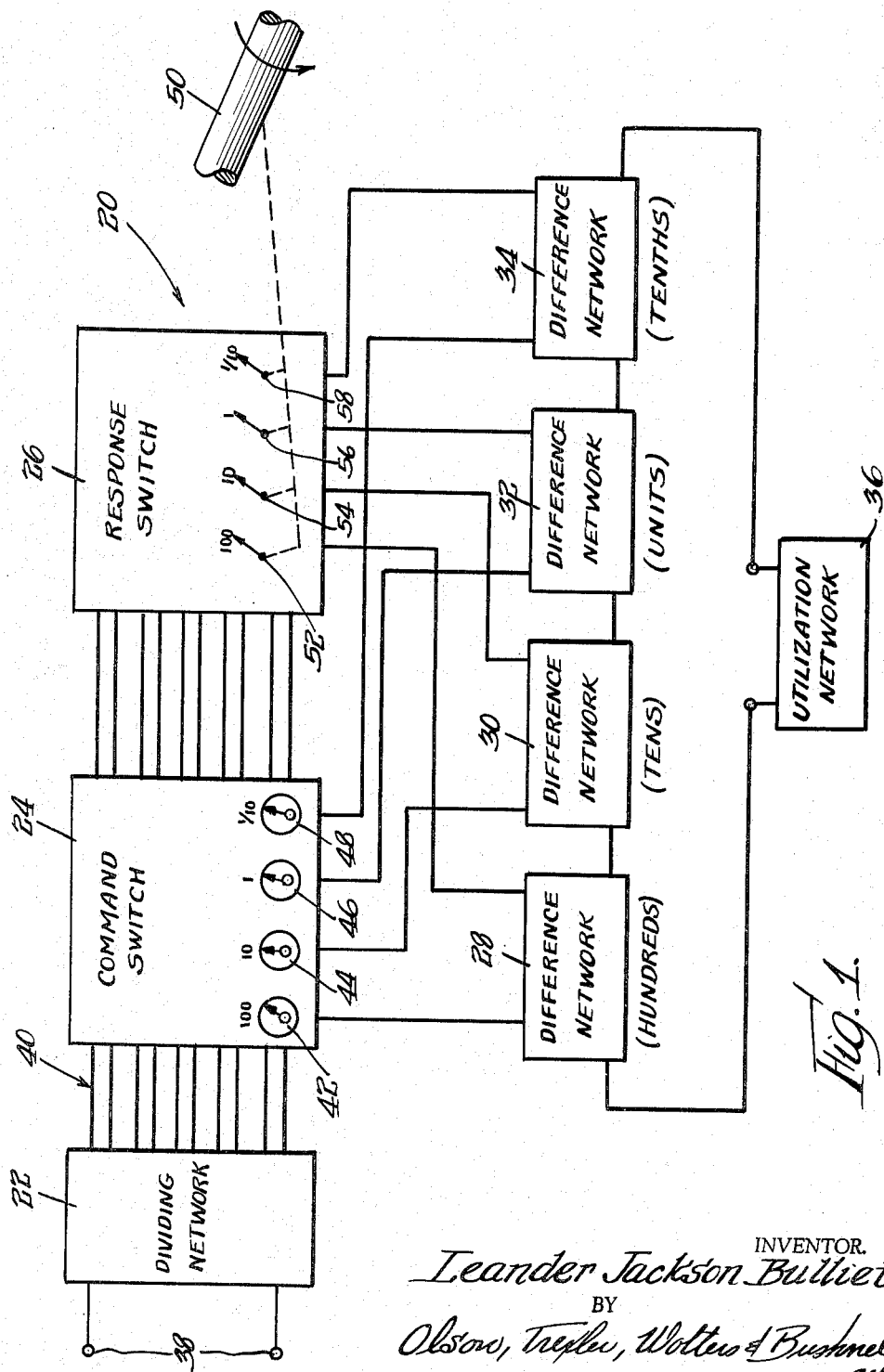

INVENTOR.
Leander Jackson Bulliet
BY
Olson, Trexler, Wolters & Bushnell
attys.

INVENTOR.
Leander Jackson Bulliet
BY
Olson, Trexler, Wolters & Bushnell
Attys.

United States Patent Office 3,234,374
Patented Feb. 8, 1966

3,234,374
APPARATUS FOR USE IN DIFFERENCE COMPUTATION
Leander Jackson Builliet, Rockford, Ill., assignor, by mesne assignments, to The Babcock & Wilcox Company, New York, N.Y., a corporation of New Jersey
Filed Aug. 22, 1962, Ser. No. 218,635
12 Claims. (Cl. 235—193)

This invention relates generally to computers and more particularly to computers for determining both the difference between two quantities and the algebraic sign of such difference.

In the past, digital computers have been employed to determine both the difference between two quantities and the algebraic sign of such difference; and computers of this type have the marked advantage of providing an absolute zero output when the subtracted quantities are equal. As a result of this null characteristic of digital computers, they are particularly useful for accurately stopping the movement of an element being controlled by the difference signal. However, digital computers are ordinarily comprised of rather costly components and, to be useful for control purposes, require a conversion of the digitally expressed output into an analog signal, i.e. a signal whose magnitude is proportional to the result of the computation.

Analog computers are also utilized in determining both the difference between two quantities and the algebraic sign of such difference; and analog computers deliver an output which is proportional to the computed difference. Analog computers thus possess the advantage of having an output which is useable directly. Furthermore, analog computers are relatively inexpensive to construct if high accuracy is not required. However, computers of this type are not easily provided with a sharply defined null when the two subtracted quantities are equal and, hence, are inclined to cause hunting or oscillation about a target value when incorporated in a control system. Under certain conditions, it has also proved difficult to obtain the algebraic sign of a difference determined by an analog computer.

Heretofore, there has been little interest in attempting to develop a computer combining the desirable features of both the digital and the analog computer; and as a consequence, the disadvantages of a particular type of computer have been an inherent liability to be accepted along with the accruing advantages.

Therefore, an important object of the present invention is to provide a computer utilizing a digital input and providing an analog output.

A more general object of the invention is to provide new and improved apparatus for use in performing a difference computation.

Another object of the invention is to provide computer apparatus which is inexpensive to manufacture and which delivers a true zero output when the subtracted quantities are equal.

Yet another object of the invention is to provide a computer which is arranged to use voltage signals and to minimize the effects on such signals of any current tending to pass through the computer circuitry.

And yet another object of the invention is to provide computer apparatus which accurately determines the algebraic sign of a computed arithmetic difference.

A further object of the invention is to provide computer apparatus incorporating compatible utilization circuitry.

These and other objects and features of the invention will become more apparent upon a reading of the following descriptions.

Computer apparatus in accord with the invention includes a voltage divider having tap connections defining a sequence of potentials; first switch means connected to the voltage divider for selecting at least one of the potentials whereby to establish a first input signal; second switch means connected to the voltage divider for selecting at least one of the potentials whereby to establish a second input signal; and voltage comparing means connected to the first and second switch means to deliver an output whose magnitude is substantially proportional to the arithmetic difference in magnitude between the input signals and whose phase relative to the signal appearing at the voltage divider determines the algebraic sign of the arithmetic difference.

Figure 2:
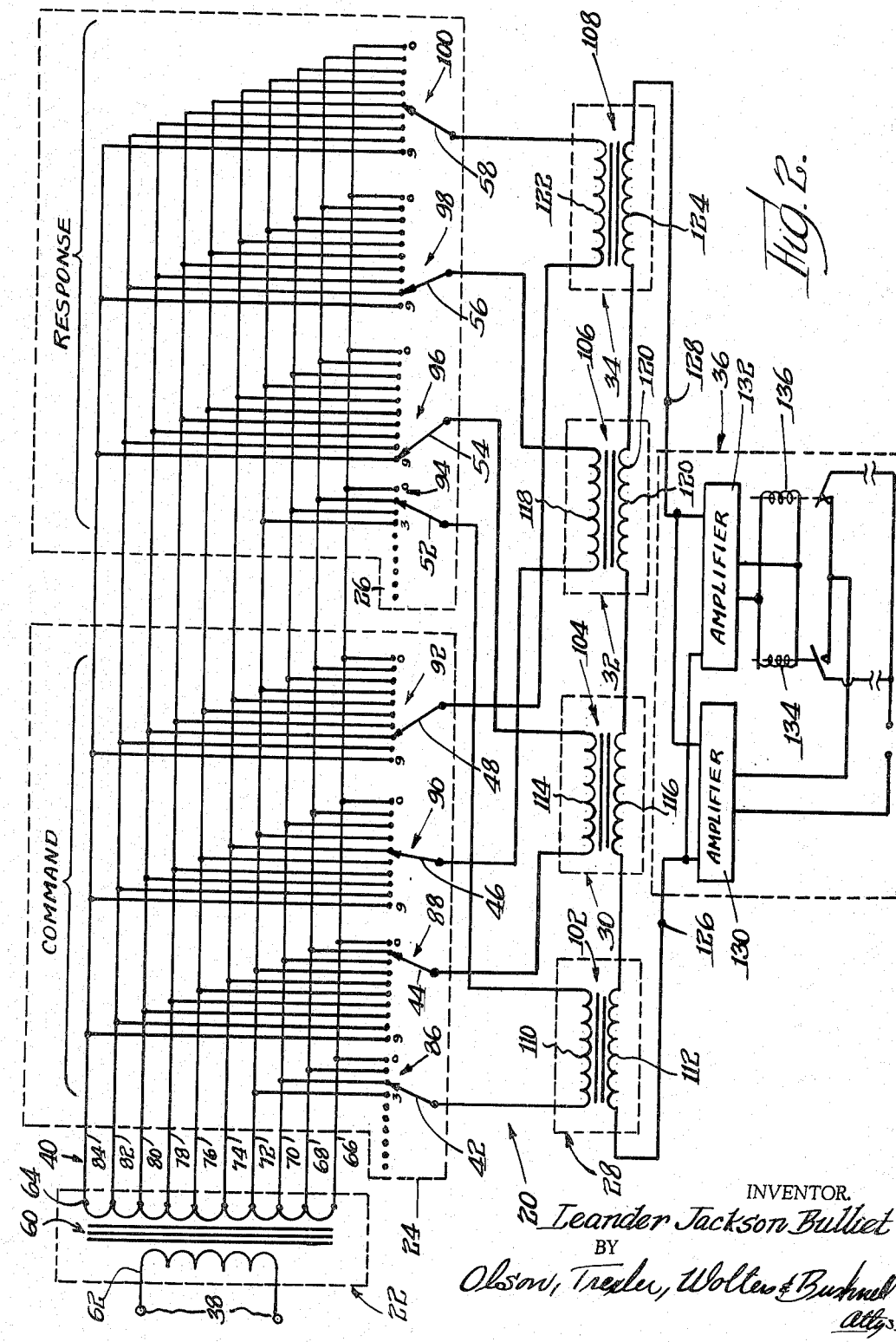

In order that the principles of the invention may be readily understood, a single embodiment thereof applied to the computation of differences between angular values, but to which the application is not to be restricted, is shown in the accompanying drawings wherein:

FIG. 1 is a schematic block diagram showing the functional relationships between the various elements of the illustrated embodiment of the computer of the present invention; and FIG. 2 is a more detailed illustration of the computer of FIG. 1.

As used herein, the term "digitally expressed quantity" is intended to refer to one of a sequence in which successive quantities differ by a substantially uniform amount and which therefore may be used to establish a quantitative language for expressing one or more working values.

Referring now in detail to the drawings, specifically to FIG. 1, computer apparatus indicated generally by the numeral 20 will be seen to comprise a dividing network 22, a command switch 24, a response switch 26, difference networks indicated by the even numerals from 28 to 34 inclusive, and a utilization circuit 36. A source 38 of suitable electrical signals is coupled to the input side of the dividing network 22; and while various electrical quantites may be usefully employed as the input to network 22, it has proved particularly advantageous to employ a voltage signal as this input. The network 22 divides the input signal into a sequence of digitally expressed quantities; and when decimal digital computations are contemplated, ten tap leads 40 are employed to conduct these digitally expressed quantities from the network 22 to both the command switch 24 and the response switch 26.

The command switch 24 includes a number of switch elements, each of which is provided with individual connections to a predetermined number of the tap leads 40; and the various switch elements, being adapted for selecting a desired digital quantity from the output of network 22, as by being manually positionable, are operable to close circuits to the selected tap leads as be being provided with movable contacts 42, 44, 46 and 48. The number of switch elements and correspondingly the number of movable contacts is dictated by the number of notational places desired in the quantities to be treated. For example, when a decimal digital computation is to be performed, the contact 42 and its corresponding switch element may be established as the hundreds place, contact 44 and its corresponding switch element the tens place, contact 46 and its corresponding switch element the units place, and contact 48 with its corresponding switch element the tenths place. Other numbers of switch elements and other numbers of places may also be employed in compliance with the requirements of specific situations. In any event, it is to be realized that command switch 24 is to be employed in determining or establishing an operating signal whose magnitude is representative of a desired digitally expressed quantity.

Response switch 26 is similarly provided with a number of switch elements corresponding in number to the notational places in the values to be treated, the switch elements in the response switch 26 having individual connections to a predetermined number of the tap leads 40. However, response switch 26 advantageously provides an indication or measure of some condition which it is desired to have compared with the predetermined quantity selected in command switch 24. For example, it may be desired to use the computer apparatus 20 to control the angular position of a rotatable shaft 50, in which case the movable contacts of the switch elements in response switch 26 may be mechanically connected to shaft 50 so as to have their configuration determined by the rotational position of the shaft. The movable contacts of the switch elements in response switch 26 are indicated by the numerals 52, 54, 56 and 58, these movable contacts corresponding in the order named to the hundreds place, the tens place, the units place and the tenths place in the decimal notation selected for use in the described embodiment of the invention.

It is to be recognized, from the descriptions thus far given, that dividing network 22 establishes a sequence of digitally expressed quantities; and from this sequence, the command switch 24 may be employed to select a desired or control signal whereas the response switch 26 may be directed to select a signal representing a condition to be controlled relative to the signal selected through command switch 24. It is also to be recognized that by dividing the output of network 22 into a sequence of digitally expressed quantities and by arranging the command switch 24 and the response switch 26 to develop values in a number of notational places, the information fed into the computing apparatus 20 is developed in digital form.

In order to perform a difference computation on the quantities determined by switches 24 and 26, the output signals from the individual switch elements are compared by the difference networks 28, 30, 32 and 34. Specifically, the outputs from the hundreds place switch elements are compared in network 28, the outputs from the respective tens switch elements are compared in network 30, the outputs from the respective units switch elements are compared in network 32, and the outputs of the tenths switch elements are compared in the network 34. Thus, individual difference operations are performed on the values in each of the selected notational places; and as will become more apparent hereinafter, the results of these respective operations are combined algebraically to develop an output signal whose magnitude is substantially proportional to the arithmetic difference in magnitude between the signals selected by response switch 26 and command switch 24 respectively. As will also be brought out hereinafter, the phase of this latter output signal relative to the signal appearing at dividing network 22 is determinative of the algebraic sign of the arithmetic difference between the signals selected by switches 24 and 26. The final output signal is impressed on the ultilization circuit 36 which may, for example, be used to cause a repositioning of shaft 50 into close approximation to the position represented by the gross value selected in command switch 24.

Turning now to a consideration of FIG. 2 for a more detailed description of the make-up and arrangement of the computer apparatus 20, dividing network 22 is seen to comprise a power transformer 60 having a primary winding 62 connected to the source 38 and having a secondary winding 64 connected at equal potential intervals, such as for example, 10 volt intervals, to the tap leads 40.

In the illustrated embodiment where the dividing network is arranged to take the form of a transformer, the source 38 is selected to provide alternating potential of some readily available value such as 115 volts. Moreover, the source 38, under such circumstances, is preferably selected to provide alternations at some value, say 400 cycles per second, which is substantially distinct from the value of alternations used in powering physically adjacent circuitry, this being done in order to avoid parasitic inductive effects in the computing apparatus 20.

The individual tap leads 40 are indicated by even numerals 66 through 84; and as has been mentioned, these individual tap leads are connected to the secondary winding 64 of power transformer 60 at equal potential intervals. Thus, the potential difference between tap lead 66 and tap lead 68 is 10 volts, following the exemplification given hereinabove, whereas the potential difference between tap lead 66 and tap lead 70 is 20 volts. The remaining tap leads develop, in a similar manner, a sequence of quantities which differ by a substantially constant value whereby to establish the digitally expressed quantities to be utilized by command switch 24 and response switch 26.

The command switch 24 is shown to comprise individual switch elements 86, 88, 90 and 92 corresponding respectively to the notational places designated hundreds, tens, units, and tenths in the decimal digital notation selected for the illustrated embodiment. Similarly, the response switch 26 is shown to comprise individual switch elements 94, 96, 98 and 100 representing the corresponding sequence of notational places. It will become apparent from an inspection of FIG. 2 that the stationary contacts of each of the several switch elements are connected in the order of value to the tap leads 40, i.e. the zero contact of each switch element is connected to tap lead 66, the number one contact of each switch element is connected to tap lead 68 and so on in similar fashion. However, it will be recalled that the illustrated embodiment is contemplated for use in computing angular or shaft position; and one conventional measure of such angular or shaft position is in degrees of a circle and subdivisions thereof. Accordingly, the switch elements representing the hundreds notational place include connection of their stationary contacts to only the tap leads 66, 68, 70 and 72 whereby to limit the highest significant figure in the hundreds notational place to three.

The arithmetic operation of subtraction is performed in computer apparatus 20 by the difference networks 28, 30, 32 and 34; and in the illustrated embodiment these difference networks specifically comprise transformers indicated respectively by the numerals 102, 104, 106 and 108. Since the number of switch elements in both the command and response switch and the number of difference networks are intended to correspond to the maximum number of notational places in the values to be treated, four difference networks are provided, as shown; and the individual computing transformers embodying the respective difference networks include primary windings having their terminals connected to the movable contacts of those switch elements in command switch 24 and response switch 26 which represent the corresponding notational place.

Specifically, computing transformer 102 includes a primary winding 110 whose terminals are connected respectively to movable contact 42 in the command switch and movable contact 52 in the response switch, transformer 102 further including a secondary winding 112. Transformer 104 includes a primary winding 114 whose terminals are connected to the movable contacts 44 and 54, transformer 104 additionally including a secondary winding 116. Similarly, computing transformer 106 includes a primary winding 118 and a secondary winding 120, the terminals of the primary winding 118 being connected respectively to the movable contacts 46 and 56. Finally, computing transformer 108 includes a primary winding 122 whose terminals are connected respectively to the movable contacts 48 and 58, transformer 108 additionally including a secondary winding 124.

From the descriptions thus far given, it will be apparent that an electrical potential impressed on the primary winding 62 of power transformer 60 is divided into a digital sequence of potentials by the tap leads 40. Furthermore, a given one of these digital potentials can be selected at each of the switch elements in command switch 24 and response switch 26. Thus, a voltage can be made to appear at the primary winding of each of the computing transformers 102, 104, 106 and 108 that is the arithmetic difference between the potentials selected by the two switch elements to which the terminals of the primary winding of the transformer are connected. For example, the hundreds difference network 28 is shown as having the terminals of the primary winding 110 connected to movable contact 42 which has been located to close a circuit to tap lead 70. The opposite terminal of winding 110 is connected to movable contact 52 which has been positioned to close a circuit to tap lead 68. Thus, a potential difference corresponding to the potential difference across leads 68 and 70 will appear at winding 110; and according to the exemplified values given hereinabove, this potential difference is 10 volts and corresponds to a single digitally expressed quantity. Hence, the arithmetic operation thus far accomplished by transformer 102 resides in the determination of a "1" value in the hundreds notational place in the illustration. In like manner, a potential representative of the number "8", the difference between nine and one, appears at the primary winding 114 of computing transformer 104; a potential difference indicative of the number "4", the difference between eight and four, appears at the primary winding 118 of computing transformer 106, and a potential difference indicative of the number "2", the difference between seven and five, appears at the primary winding 122 of computing transformer 108. It will be apparent therefore that the magnitude of the potential applied to the primary winding of any computing transformer is equal to the numerical difference between the corresponding command and response digits multiplied by the volts per increment between the tap leads to the secondary winding of power transformer 60. The phase of the potential across the primary of a computing transformer, relative to the end tap 66 of transformer 60, depends on whether the corresponding switch element in the command or in the response switch is set at the higher numbered position. Accordingly, the potential appearing at any one of the computing transformers represents a magnitude established by an arithmetic difference computation and possessed of algebraic sign corresponding to the phase of the potential relative to end tap 66 of the power transformer.

Since an algebraic summation of the potentials appearing at the primary windings of the computing transformers may thus be performed, appropriate weighting of the individual potential differences can be made to establish the desired relationship between the various notational places represented respectively by each of the computing transformers. Nominally, the ratio of transformer 102 is then 10/1, that of transformer 104 is 1/1, that of transformer 106 is 1/10 and that of transformer 108 is 1/100 whereby to develop the decimal digital relationship required in the illustration. Because the input potentials to the primary windings of the various computing transformers are derived from a single source, transformer 60, these potentials are either in phase with or 180° out of phase with respect to each other; and under such circumstances, the secondary windings of the computing transformers may be connected in electrical series circuit, as shown, to provide a summation of the magnitudes selected by the command and response switches. Because of the described phase relationship, this summation is a vector which is, in effect, an algebraic summation.

Terminals 126 and 128 are provided in the series circuit incorporating the secondary windings of the computing transformers; and from the above descriptions, it will be apparent that the alternating potential appearing across these terminals represents the numerical difference in magnitude and sign between the value established at command switch 24 and the value established at response switch 26. This output signal from the serially connected secondary windings of the computing transformers is particularly valuable for control purposes because the computer apparatus 20 is specifically arranged to provide a true zero output when the quantities indicated at the command switch 24 and at the response switch 26 are equal.

Upon inspection of FIG. 2, it will be observed that the primary windings of the several computing transformers have their respective terminals connected to the same conductor or tap lead when the movable contacts of the respective switch elements have been directed to correspondingly enumerated stationary contacts. Thus, the primary winding of a computing transformer is short circuited whenever equal values are called for in the corresponding switch elements; and according to a feature of the invention, at the time when equal values are selected in both the command and the response switch, each of the computing transformers has its primary winding short circuited whereby to provide a true zero output. It is recognized that this highly desirable condition can be deleteriously affected by spurious potentials induced by adjacent circuitry. However, errors of this latter character can be minimized or eliminated completely by the exercise of care in the location of computer apparatus 20 and by appropriately selecting the frequency of the source 38.

In accordance with another important feature of the invention, the secondary winding 64 of power transformer 60 is selected to display a relatively small internal impedance whereas the primary windings 110, 114, 118 and 122 of the computing transformers are selected to display relatively large internal impedances. So arranged, computer apparatus 20 is subject to only minimal errors arising from the passage of current through the primary windings of the computing transformers and through the secondary winding 64 of the power transformer. In addition, the utilization circuit 36 is selected to display a relatively high impedance in order that no significant secondary currents may occur in the computing transformers to be reflected back into the respective primary windings. Thus, current effects in the utilization circuit 36 are prevented from working an adverse effect on the output distribution from power transformer 60.

In accordance with a still further feature of the invention, the transformation ratios of the computing transformers are selected to favor the more significant digit or notational place whereby to prevent erroneous phase determinations, i.e. erroneous determinations of the algebraic sign of the computed answer, such erroneous determinations being a particular problem when the computation involves determining relatively small differences between relatively large values. To preclude errors of this latter nature, the transformation ratios of the several computing transformers are held between particular limits wherein the permitted variation in ratio is a geometric variation and, preferably, a uniform geometric variation. In one useful embodiment of the invention, the transformation ratio of transformer 102 has been selected to fall between 10.2–10.3/1, that of transformer 104 between 1.01–1.02/1, that of transformer 106 between 0.100–0.101/1 and that of transformer 108 between 0.009–0.010/1. As will be recognized, a uniform geometric variation of one percent from nominal was allowed in this specific embodiment.

Returning to a consideration of FIG. 2 for a detailed description of utilization circuit 36, the circuit 36 is seen to be connected to terminals 126 and 128 of the series electrical circuit that incorporates the secondary windings of the computing transformers. In the illustrated embodiment, the output signal appearing across terminals 126 and 128 comprises the input signal to a pair of amplifiers 130 and 132 of either the vacuum tube or semi-conductor type. This input to the amplifiers 130 and 132 is a parallel connected input. Amplifier 130 is desirably a linear power amplifier which is arranged to be unresponsive to input signals less than a selected value, for example, less than one-tenth of a volt. On the other hand, the output of amplifier 132 is impressed on the coils of parallel connected relays 134 and 136. The overall network comprising amplifier 132 and relays 134 and 136 is arranged to be phase sensitive. Accordingly, when the signal appearing at terminals 126 and 128 is of a given phase or polarity, one of the relays 134 and 136 is energized to close an appropriate circuit; and when the signal appearing at terminals 126 and 128 is of the opposite phase or polarity, the opposite relay is energized to close the corresponding circuit. When the signal appearing at terminals 126 and 128 is of zero magnitude, neither relay is energized. With the utilization circuit 36 so arranged, the relays 134 and 136 may be made to condition suitable control circuitry for actuation by the output signal from amplifier 130. For example, relay 134 may be arranged with control circuitry adapted to rotate shaft 50 in a clockwise direction whereas relay 136 may be arranged with corresponding circuitry to rotate shaft 50 in a counterclockwise direction.

The specific example herein shown and described is to be considered as being primarily illustrative. Various changes in construction and arrangement will, no doubt, occur to those skilled in the art; and such changes are to be understood as forming a part of this invention insofar as they fall within the true spirit and scope of the appended claims.

The invention is claimed as follows:

1. Apparatus for use in performing a difference computation comprising: a power transformer including a secondary winding and taps on said winding at intervals for dividing the output potential into a sequence of quantities; a plurality of first switch means having individual connections to a predetermined number of said taps for selecting a desired voltage, each of said first switch means corresponding to an individual notational place in the value to be selected; a plurality of second switch means responsive to a condition to be indicated and having individual connections to a predetermined number of said taps for selecting a voltage indicative of said condition, each of said second switch means corresponding to an individual notational place in the value to be indicated; and a plurality of difference determining means individually connected to a said first switch means and to the notationally corresponding second switch means, the outputs of said difference determining means being connected in algebraically additive relationship to develop a signal whose magnitude is substantially proportional to the arithmetic difference in magnitude between said voltages.

2. Apparatus according to claim 1 wherein each of the first and second switch means represents a given notational place and wherein the second switch means which represents a given notational place is connected to the same taps of said power transformer as the first switch means representing the corresponding notational place whereby to promote a true determination of zero when identical values are selected at the respective first and second switch means.

3. Apparatus according to claim 1 wherein said predetermined numbers are selected to express divisions of a circle.

4. Apparatus for use in performing a difference computation comprising: a power transformer including a secondary winding and taps on said winding at intervals for dividing the output potential into a sequence of quantities; a plurality of first switch means having individual connections to a predetermined number of said taps for selecting a desired voltage, each of said first switch means corresponding to an individual notational place in the value to be selected; a plurality of second switch means responsive to a condition to be indicated and having individual connections to a predetermined number of said taps for selecting a voltage indicative of said condition, each of said second switch means corresponding to an individual notational place in the value to be indicated; and a plurality of computing transformer of different transformation ratio individually connected to said first and second switch means, each of said computing transformers having a secondary winding connected in series circuit with the secondary windings of the other of said computing transformers to develop an output signal whose magnitude is substantially proportional to the arithmetic difference in magnitude between said voltages.

5. Apparatus for use in performing a difference computation comprising: a power transformer including a secondary winding and taps on said winding at intervals for dividing the output potential into a sequence of quantities; a plurality of first switch means having individual connections to a predetermined number of said taps for selecting a desired voltage, each of said first switch means corresponding to an individual notational place in the value to be selected; a plurality of second switch means responsive to a condition to be indicated and having individual connections to a predetermined number of said taps for selecting a voltage indicative of said condition, each of said switch means corresponding to an individual notational place in the value to be indicated; and a plurality of computing transformers, each having a primary winding connected to a said first switch means and to the notationally corresponding second switch means, each of said computing transformers further having a secondary winding connected in series circuit with the secondary windings of the other of said computing transformers to develop an output signal whose magnitude is substantially proportional to the arithmetic difference in magnitude between said voltages and whose phase relative to the signal appearing at said power transformer determines the algebraic sign of said arithmetic difference.

6. Apparatus according to claim 4 wherein said transformation ratios differ in decimal sequence.

7. Apparatus for use in performing a difference computation comprising: a power transformer including a secondary winding and taps on said winding at intervals for dividing the output potential into a sequence of quantities; a plurality of first switch means having individual connections to a predetermined number of said taps for selecting a desired voltage, each of said first switch means corresponding to an individual notational place in the value to be selected; a plurality of second switch means responsive to a condition to be indicated and having individual connections to a predetermined number of said taps for selecting a voltage indicative of said condition, each of said second switch means corresponding to an individual notational place in the value to be indicated; a plurality of difference determining means individually connected to a said first switch means and to the notationally corresponding second switch means, the outputs of said difference determining means being connected in algebraically additive relationship to develop a signal whose magnitude is substantially proportional to the arithmetic difference in magnitude between said voltages; and utilization circuit means connected to the outputs of said difference determining means and operative in response to signals only above a predetermined level.

8. Apparatus for use in performing a difference computation comprising: a power transformer including a secondary winding and taps on said winding at intervals for dividing the output potential into a sequence of quantities; a plurality of first switch means having individual connections to a predetermined number of said taps for selecting a desired voltage, each of said first switch means corresponding to an individual notational place in the value to be selected; a plurality of second switch means responsive to a condition to be indicated and having individual connections to a predetermined number of said taps for selecting a voltage indicative of said condition, each of said second switch means corresponding to an individual notational place in the value to be indicated;

a plurality of computing transformers, each having a primary winding connected to a said first switch means and to the notationally corresponding second switch means, each of said computing transformers further having a secondary winding connected in series circuit with the secondary windings of the other of said computing transformers to develop an output signal whose magnitude is substantially proportional to the arithmetic difference between said voltages and whose phase relative to the signal appearing at said power transformer determines the algebraic sign of said arithmetic difference, wherein the impedance in the secondary winding of said power transformer is relatively small and wherein the impedance in each of the primary windings of said computing transformers is relatively large.

9. Apparatus according to claim 8 and further comprising a utilization circuit means connected in said series circuit and having a relatively large impedance.

10. Apparatus for use in performing a difference computation comprising: a power transformer including a secondary winding and taps on said winding at intervals for dividing the output potential into a sequence of quantities; a plurality of first switch means having individual connections to a predetermined number of said taps for selecting a desired voltage, each of said first switch means corresponding to an individual notational place in the value to be selected; a plurality of second switch means responsive to a condition to be indicated and having individual connections to a predetermined number of said taps for selecting a voltage indicative of said condition, each of said second switch means corresponding to an individual notational place in the value to be indicated; a plurality of computing transformers of different transformation ratio, each of said computing transformers having a primary winding connected to a said first switch means and to the notationally corresponding second switch means, each of said computing transformers further having a secondary winding connected in series circuit with the secondary windings of the other of said computing transformers to develop an output signal whose magnitude is substantially proportional to the arithmetic difference in magnitude between said voltages and whose phase relative to the signal appearing at said power transformer determines the algebraic sign of said arithmetic difference, wherein said transformation ratios are held between specified limits and wherein the permitted variation in ratio is a geometric variation.

11. Apparatus according to claim 10 wherein the permitted variation in transformation ratio is a uniform geometric variation.

12. Apparatus for use in performing a difference computation comprising: a power transformer including a secondary winding and taps on said winding at intervals for dividing the output potential into a sequence of quantities; a plurality of first switch means having individual connections to a predetermined number of said taps for selecting a desired voltage, each of said first switch means corresponding to an individual notational place in the value to be selected; a plurality of second switch means responsive to a condition to be indicated and having individual connections to a predetermined number of said taps for selecting a voltage indicative of said condition, each of said second switch means corresponding to an individual notational place in the value to be indicated, the second switch means which represents a given notational place being connected to the same taps as the first switch means representing the corresponding notational place whereby to promote a true determination of zero when identical values are selected at the respective first and second switch means; and a plurality of computing transformers, each having a primary winding connected to a said first switch means and to the notationally corresponding second switch means, each of said computing transformers further having a secondary winding connected in series circuit with the secondary windings of the other of said computing transformers to develop an output signal whose magnitude is substantially proportional to the arithmetic difference in magnitude between said voltages and whose phase relative to the signal appearing at said power transformer determines the algebraic sign of said arithmetic difference.

References Cited by the Examiner

UNITED STATES PATENTS

| | | | |
|---|---|---|---|
| 2,736,852 | 2/1956 | Nelson | 340—347 |
| 2,738,504 | 3/1956 | Gray | 340—347 |
| 2,820,937 | 1/1958 | Fagerl | 340—347 |
| 2,823,344 | 2/1958 | Ragland | 318—467 |
| 2,881,419 | 4/1959 | Rothbart | 340—347 |
| 3,035,214 | 5/1960 | Kelling | 340—347 |
| 3,039,030 | 6/1962 | Weidner | 340—347 |
| 3,040,221 | 6/1962 | Fitzner | 340—347 |

OTHER REFERENCES

Page 179, June 1947, Maynall, "Electrical Analogue Computing," Electronic Engineering.

MALCOLM A. MORRISON, *Primary Examiner.*